United States Patent [19]

Rochman

[11] Patent Number: 4,545,459
[45] Date of Patent: Oct. 8, 1985

[54] PROTECTIVE MEANS FOR NEUTRALIZING THE OPERATION OF A MOTOR VEHICLE HAVING AUTOMATIC TRANSMISSION

[76] Inventor: Tzur Rochman, 53 Hachashomonaim St., Tel Aviv, Israel, 65273

[21] Appl. No.: 557,902

[22] Filed: Dec. 5, 1983

Related U.S. Application Data

[63] Continuation-in-part of Ser. No. 272,578, Jun. 11, 1981, abandoned.

[51] Int. Cl.⁴ .............................................. B60R 25/06
[52] U.S. Cl. .................................................... 180/287
[58] Field of Search ............................. 180/271, 287; 74/DIG. 1, DIG. 2, 846, 878

[56] References Cited

U.S. PATENT DOCUMENTS

| | | | |
|---|---|---|---|
| 3,574,288 | 4/1971 | Barth | 180/271 |
| 3,707,891 | 1/1973 | Asano | 74/DIG. 1 |
| 3,718,202 | 2/1973 | Brock | 180/287 |
| 3,760,898 | 9/1973 | Kendall | 180/287 |
| 4,084,657 | 4/1978 | Bradley | 180/287 |

Primary Examiner—Joseph F. Peters, Jr.
Assistant Examiner—Joseph McCarthy
Attorney, Agent, or Firm—Charles W. Helzer

[57] ABSTRACT

An all mechanically operated device for preventing the theft of motor vehicles having automatic transmission gears and having a main transmission oil line provided between the pressure outlet of a transmission oil pump and the automatic transmission gears for supplying transmission oil under pressure to the automatic transmission gears; said device comprising a branch transmission oil line connected between said main line and a transmission oil sump, and a selectively operated bypass valve connected in said branch line so that when said bypass valve is open, the transmission oil pressure to the automatic gears is neutralized thereby preventing transmission drive for the motor vehicle.

3 Claims, 2 Drawing Figures

PROTECTIVE MEANS FOR NEUTRALIZING THE OPERATION OF A MOTOR VEHICLE HAVING AUTOMATIC TRANSMISSION

This application is a continuation-in-part application of prior U.S. patent application Ser. No. 272,578 filed June 11, 1981 now abandoned.

The present invention concerns means for neutralizing the operation of a motor vehicle having automatic gears with a view to prevent its theft.

Many electrical and mechanical devices are known which aim to prevent the theft of motor cars. Most of these devices are based on the assumption that if an audio signal is given when a car is broken into, a passer-by will take notice. This however, has been proven not to be the case. There are also known means which interupt the electric circuit so that the vehicle cannot be started. This, too, has been proven useless, since a car thief can find way to bypass the interupted circuit in an easy and on-the-spot manner.

The present invention is based on the knowledge that if the oil pressure in the automatic gear is released, the car cannot be moved.

The invention consists in a device for preventing the theft of motor vehicles having automatic gears, characterised in that a branch line operable by a selectively operated valve is provided in the main fluid line between the pump and the conventional regulator valve of the automatic transmission hydraulic system.

The additional selectively operated valve may be operated by any suitable known means provided in a convenient position in the vehicle for the driver. Preferably, however, the additional selectively operated valve comprises an integral part of the conventional, key actuated, cylinder lock which starts operation of the motor vehicle.

The invention is illustrated, by way of example only, in the accompanying drawings in which.

Figure 1:
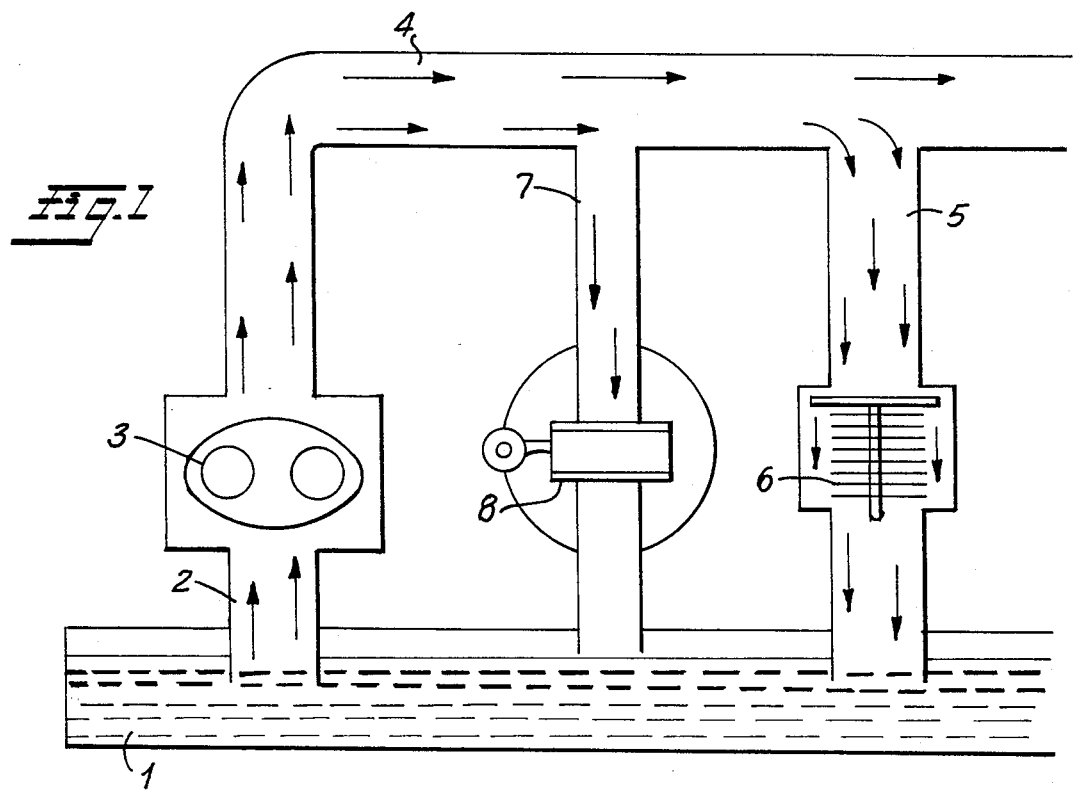
FIG. 1 shows schematically one embodiment of a protective system according to the invention in the closed condition.
Figure 2:
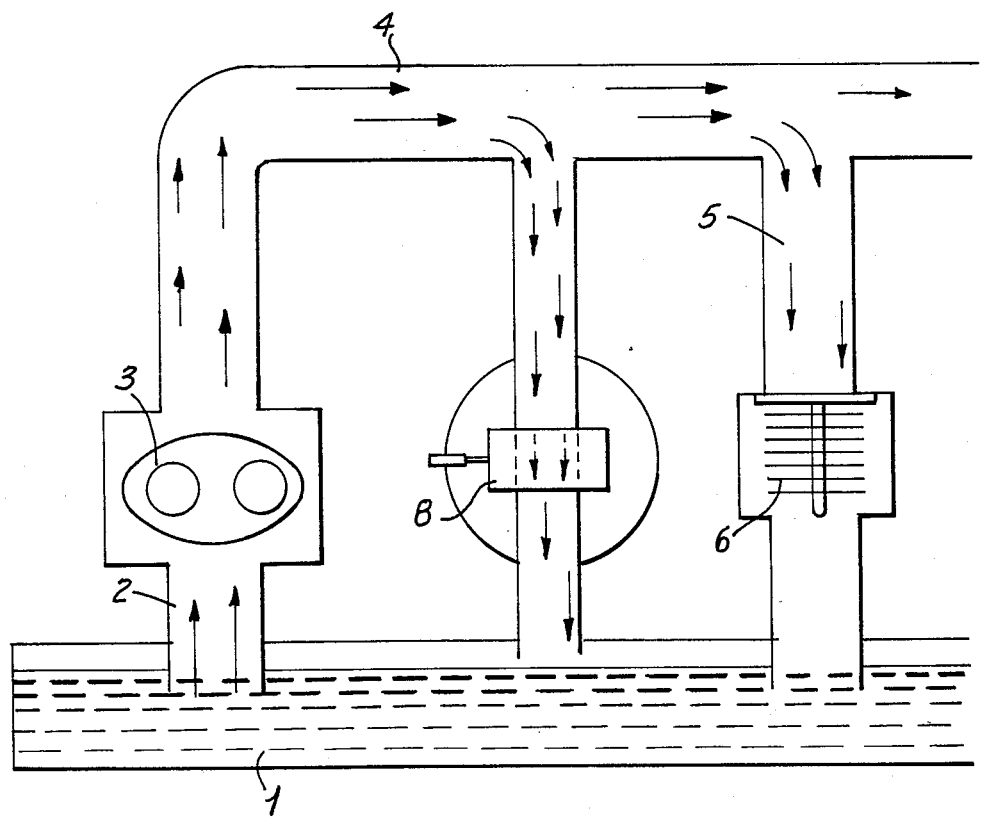
FIG. 2 shows the system of FIG. 1 in the open condition.

In the protective system of FIGS. 1 and 2, an oil storage pan 1 supplies transmission oil through a line 2 to a pump 3 whose pressurized output flows to a main trunk line 4 and from there to the automatic gear box of a motor vehicle or the like (not shown). A first branch line 5 branches off main trunk line 4 and is controlled by conventional pressure regulator valve 6 which returns any bypassed transmission oil to pan 1. As known, the pressure regulator valve 6 controls the pressure of the transmission oil in line 4 to assure a proper oil flow to the said gear box.

According to the invention a second branch line 7 leads off from main trunk line 4 and is controlled by a selectively operated valve 8 in the second branch line 7 which leads back to pan 1 in parallel with the first branch line 5.

During normal operation of the motor vehicle as shown in FIG. 1, oil is pumped by pump 3 so that it flows through line 4 to the regulator valve 6 which normally is open to permit return flow through line 5 back to storage pan 1 and to the automatic transmission gear box (not shown). This is effected only because valve 8 is closed under normal operating conditions and therefore the pressure of the oil in line 4 supplied to the automatic transmission gear box is that for which pressure regulator valve 6 has been preset.

If selectively operated valve 8 is open, as shown in FIG. 2, the transmission oil flow will not reach the extension of main trunk line 4 supplying the automatic transmission gear box or line 5, but instead will be bypassed through line 7 and open valve 8 back to pan 1 to thereby neutralize the pressure within line 4 and prevent operation of the automatic transmission.

The selective operation of valve 8 may be effected by any conventional means, i.e., electrically, mechanically, hudraulically or the like, actuated by the driver. Such means may be disposed in a secret position in the vehicle so that an unauthorized person cannot easily find it. Preferably, however, the valve 8 may be an integral part of the conventional cylinder-type ignition lock which starts the operation of the motor vehicle. The valve comprises a housing to which the branch line 7 is connected in two opposite ends thereof. Within the housing a valve cylinder having a transverse through-flow passage is provided rotatably therein and is adapted to be so rotated by a key 9 such as the key of a conventional cyclinder-type ignition lock. When the ignition lock is in the locked position, the branch line 7 is opened by valve 8. Thus, when the motor vehicle is parked and locked by an operator, there is no pressure supplied to the transmission gears. Hence, even if the engine ignition is bypassed and the engine started, no oil is supplied to the automatic transmission gear box. Only if a driver with the proper key 9 turns the lock and thereby closes valve 8 will transmission oil flow from pump 3 to the transmission gear box. In this manner the feature will prevent the theft of the motor vehicle.

Having described several embodiments of a protective means for neutralizing the operation of a motor vehicle having automatic transmission constructed in accordance with the invention, it is believed obvious that other modifications and variations of the invention will be suggested to those skilled in the art in the light of the above teachings. It is therefore to be understood that changes may be made in the particular embodiment of the invention described which are within the full intended scope of the invention as defined by the appended claims.

What is claimed is:

1. An all mechanically operated device for preventing the theft of motor vehicles having automatic transmission gears and having a main transmission oil line provided between the pressure outlet of a transmission oil pump and the automatic transmission gears for supplying transmission oil under pressure to the automatic transmission gears; said device comprising a branch transmission oil line connected between said main line and a transmission oil sump, a selectively operated bypass valve connected in said branch line so that when said bypass valve is open, the transmission oil pressure to the automatic gears is neutralized thereby preventing transmission drive for the motor vehicle, and a pressure regulator valve connected between the main transmission oil line and the oil sump for controlling the transmission oil pressure supplied to the automatic gears with the branch line and the selectively operated bypass valve being interposed between the transmission oil pump outlet and the inlet to the pressure regulator valve and connected in parallel with the pressure regulator valve and pump.

2. A device according to claim 1 wherein the selectively operated bypass valve is key operated and the key may be removed by an operator of the motor vehicle with the bypass valve locked in the open position.

3. A device according to claim 2 wherein the key operated selectively operated bypass valve comprises a part of the conventional cylinder-type ignition lock of the motor vehicle so that the bypass valve is placed in the open position automatically with actuation of the ignition key of the motor vehicle to its off condition.

* * * * *